J. GARFIELD.
HAY SPREADER.
No. 64,518. Patented May 7, 1867.
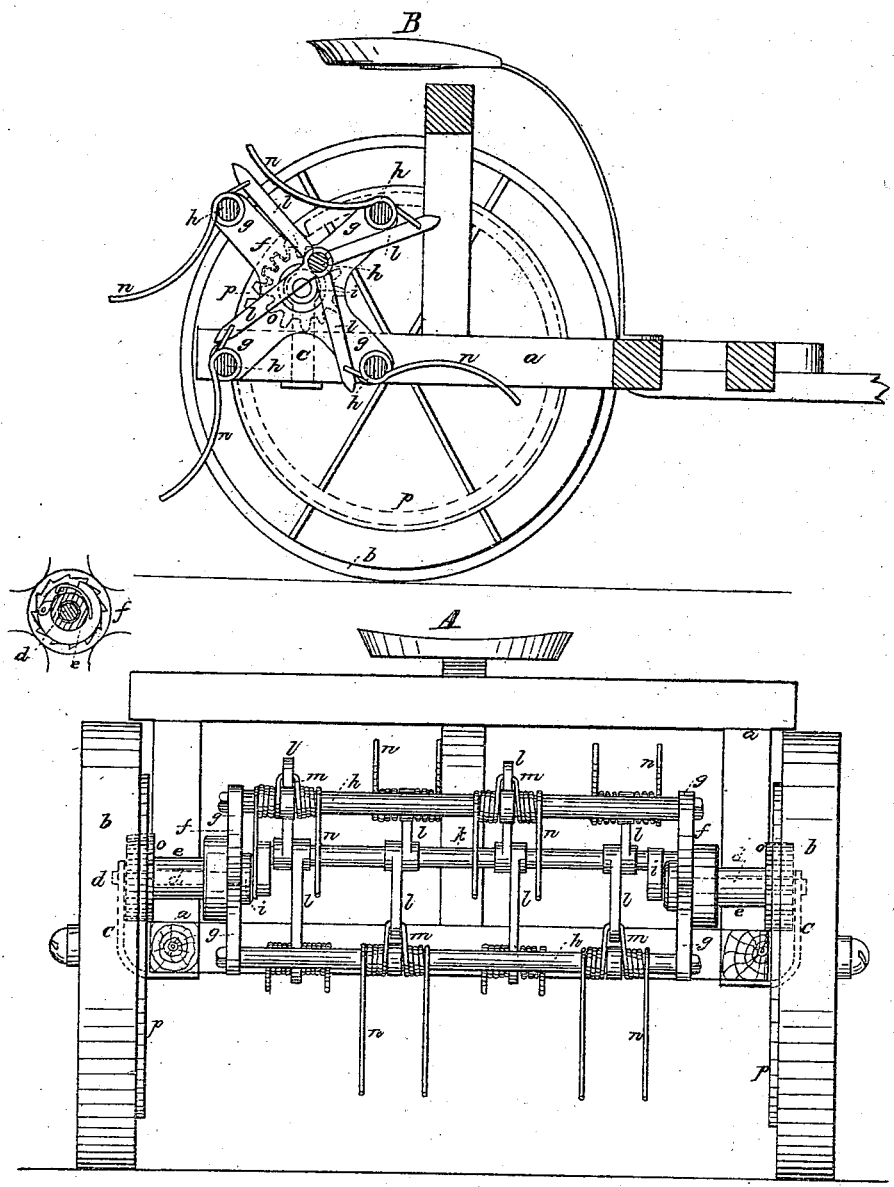
Witnesses
Ab. W. Frothingham
S. B. Kidder
Inventor
Joel Garfield

United States Patent Office.

JOEL GARFIELD OF GROTON, MASSACHUSETTS.

Letters Patent No. 64,518, dated May 7, 1867.

---

IMPROVEMENT IN HAY-SPREADERS.

---

*The Schedule referred to in these Letters Patent and making part of the same.*

---

TO ALL WHOM IT MAY CONCERN:

Be it known that I, JOEL GARFIELD, of Groton, in the county of Middlesex, and State of Massachusetts, have invented an improved Hay-Tedding Machine; and I do hereby declare that the following, taken in connection with the drawings which accompany and form part of this specification, is a description of my invention sufficient to enable those skilled in the art to practise it.

The invention relates to the construction and arrangement and mechanism of that class of tedding machines in which the teeth act by rotation around a common axis or axial line, and have, in addition to their rotary motion, an elliptical or sweeping-forward movement as they operate upon the grass or hay. The invention consists in mounting the rotary and eccentrically-moving forks or teeth in an open frame, in such manner that in their operation they act free from any stripping surface.

The drawings represent a machine embodying my invention, A showing a rear elevation, and B a section between two adjacent sets of forks. $a$ denotes the wagon or trunk-frame to which the tedding mechanism is applied, and $b$ the wheels of the same. On the rear part of this frame are brackets or bearings, $c$, supporting a stationary shaft, $d$, around each end of which is a rotary tubular shaft, $e$, upon the inner end of each of which tubular shafts is a loosely-revolving head, $f$, radial arms $g$ of which are connected together by shafts, $h$, as seen in the drawings, the shafts $h$ and heads $f$ making up the frame for supporting the forks, this frame revolving loosely upon the shafts $e$ in one direction, but rotating with such shafts $e$ in the other direction. Just inside of each head $f$ the stationary shaft $d$ has a crank-arm, $i$, the outer ends of these arms being connected by the central part of the stationary shaft, this central part (which, for convenience, may be called the crank or dead-centre shaft, $k$,) being thus eccentric with the shafts $e$, upon which the heads $f$ rotate. Along this shaft (and with their inner ends turning thereupon) are placed arms $l$, extending towards the shafts $h$, each of which arms is jointed at its outer end to a loop or extension, $m$, of a fork, $n$, mounted and turning on the shaft $h$. Each fork-loop $m$ extends out from the shaft to which the fork is attached towards the direction of revolution of the shaft, and as the shafts $h$ revolve eccentrically to the stationary crank-shaft $k$, it will be obvious that by the revolution of each shaft $h$ around the crank-shaft $k$, from its nearest position to said latter shaft, around the shaft $k$ and back to such position, the connection of each arm $l$ imparts to the fork (in addition to its rotary movement) a sweeping-forward movement during the first half of its revolution, and a back or retrograde movement to its first position during the latter half of its revolution. When each shaft $h$ is nearest to the shaft $k$ (which is when its forks are uppermost) the points of these forks lie back towards the next shaft $h$, and as the shaft $h$ rotates the forks are thrown outwards, so that when operating upon the hay or grass they stand nearly radially or pointed towards the grass, and with an advancing or an accelerated motion, which causes them to catch and lift the hay as desired, while, as they progress in their rotation, they fall back again towards the next shaft behind, and thus are caused to drop the hay.

Now I am aware of the construction or proposed construction of a machine in which the teeth or forks have an accelerated motion given to them, or a motion in addition to their revolving motion, by means of a shaft eccentric to the axis of rotation of the forks, but in such machine a cylinder or drum is employed to strip the grass from the teeth, while in my machine I mount the forks in an open frame, thereby dispensing with a drum, simplifying the machine, and making it practically efficient. The rotation is imparted to the system of forks as follows: Each tubular shaft $e$ has a pinion, $o$, which meshes into and is driven by an internal gear, $p$, fixed to each wheel $b$. The tubular shaft is connected to the head $f$ by a pawl or clutch mechanism, so that as the rotation of the wheels in the forward movement of the carriage turns the pinions, the heads are also turned, and with them the forks, while in "backing" the carriage the pawl slips over the teeth of the clutch-wheel without imparting rotary movement thereto. By slipping the pawls out from the teeth the carriage is driven either forwards or back without rotating the forks.

I claim, in combination with the rotating heads and forks, and the stationary shaft $k$, placed eccentrically to the axis of rotation of such heads, the shafts $h$, arms $l$, and loops $m$, when arranged to operate substantially as described.

JOEL GARFIELD.

Witnesses:
   F. GOULD,
   L. H. LATIMER.